United States Patent
Kondo et al.

(10) Patent No.: US 12,300,409 B2
(45) Date of Patent: May 13, 2025

(54) MULTILAYER COIL DEVICE AND METHOD OF MANUFACTURING THE SAME

(71) Applicant: TDK CORPORATION, Tokyo (JP)

(72) Inventors: Shinichi Kondo, Tokyo (JP); Takashi Inagaki, Tokyo (JP); Ryuichi Wada, Tokyo (JP); Yusuke Nagai, Tokyo (JP); Takashi Suzuki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 693 days.

(21) Appl. No.: 17/571,640

(22) Filed: Jan. 10, 2022

(65) Prior Publication Data

US 2022/0238265 A1    Jul. 28, 2022

(30) Foreign Application Priority Data

Jan. 22, 2021  (JP) ................. 2021-008636

(51) Int. Cl.
| | | |
|---|---|---|
| *H01F 1/147* | (2006.01) | |
| *C08G 59/38* | (2006.01) | |
| *C08K 9/02* | (2006.01) | |
| *C22C 38/02* | (2006.01) | |
| *H01F 27/255* | (2006.01) | |
| *H01F 41/02* | (2006.01) | |
| *H01F 41/04* | (2006.01) | |

(52) U.S. Cl.
CPC .......... *H01F 1/14766* (2013.01); *C08G 59/38* (2013.01); *C08K 9/02* (2013.01); *C22C 38/02* (2013.01); *H01F 27/255* (2013.01); *H01F 41/0246* (2013.01); *H01F 41/04* (2013.01); *C08K 2201/01* (2013.01); *C22C 2202/02* (2013.01)

(58) Field of Classification Search
CPC .............. H01F 1/14766; H01F 27/255; H01F 41/0246; H01F 41/04; C08G 59/38; C08K 9/02; C08K 2201/01; C22C 38/02; C22C 2202/02
See application file for complete search history.

(56) References Cited

U.S. PATENT DOCUMENTS

| | | | | |
|---|---|---|---|---|
| 5,384,197 | A * | 1/1995 | Koyama | H01F 6/06 428/458 |
| 5,606,300 | A * | 2/1997 | Koyama | H01F 6/06 505/879 |
| 5,969,059 | A * | 10/1999 | Murai | C08F 283/00 528/92 |
| 9,418,774 | B2 * | 8/2016 | Ho | H01B 3/40 |
| 9,890,277 | B2 * | 2/2018 | Yamamoto | H02K 15/085 |
| 10,269,477 | B2 * | 4/2019 | Matsutomi | H01F 1/36 |
| 11,538,612 | B2 * | 12/2022 | Tanada | B22F 1/052 |
| 11,942,249 | B2 * | 3/2024 | Tanada | B22F 1/17 |
| 2011/0097568 | A1 * | 4/2011 | Kamae | C08G 59/3209 428/222 |
| 2012/0274438 | A1 | 11/2012 | Hachiya et al. | |
| 2017/0271062 | A1 * | 9/2017 | Furukawa | H05K 9/0075 |
| 2018/0154434 | A1 * | 6/2018 | Henmi | H01F 1/15308 |
| 2019/0198210 | A1 | 6/2019 | Suzuki et al. | |
| 2019/0272948 | A1 * | 9/2019 | Hwang | C09D 7/40 |
| 2022/0375675 | A1 * | 11/2022 | Saito | H01F 41/046 |
| 2023/0298787 | A1 * | 9/2023 | Sakurai | H01F 17/04 335/299 |

FOREIGN PATENT DOCUMENTS

| | | | | |
|---|---|---|---|---|
| JP | 2009-263645 A | 11/2009 | | |
| JP | 2012-238840 A | 12/2012 | | |
| JP | 2013199624 A | * 10/2013 | ............. | C08G 59/50 |
| JP | 2019-117898 A | 7/2019 | | |
| WO | WO-2018179440 A1 | * 10/2018 | ............... | H02K 3/30 |
| WO | 2020/189778 A1 | 9/2020 | | |

OTHER PUBLICATIONS

Clarivate Analytics machine translation of JP 2013199624 A to Kondo et al. published Oct. 3, 2013 (Year: 2013).*
Clarivate Analytics machine translation of WO 2018179440 A1 to Fukushima et al., published Oct. 4, 2018 (Year: 2018).*

* cited by examiner

*Primary Examiner* — Jane L Stanley
(74) *Attorney, Agent, or Firm* — Oliff PLC (57) ABSTRACT

A multilayer coil device includes an element formed by laminating a coil conductor and a magnetic element body. The magnetic element body includes soft magnetic particles and an epoxy resin. The soft magnetic particles include soft magnetic metal particles. The epoxy resin has an epoxy value of 150 or less. The epoxy resin is filled in gap spaces between the soft magnetic particles.

5 Claims, 2 Drawing Sheets

MULTILAYER COIL DEVICE AND METHOD OF MANUFACTURING THE SAME

BACKGROUND OF THE INVENTION

The present invention relates to a multilayer coil device and a method of manufacturing the same.

Multilayer coil devices, such as transformers, choke coils, and inductors, are known as electronic components used in power supply circuits of various electronic devices, such as mobile devices.

In the structure of such multilayer coil devices, a coil as an electrical conductor is disposed around a magnetic material exhibiting predetermined magnetic characteristics. As the magnetic material, various materials can be used depending on the desired characteristics.

To deal with further miniaturization, lower loss, and higher frequency of the multilayer coil devices, attempts have been recently made to use a soft magnetic material as the magnetic material.

Here, when a soft magnetic material is used as the magnetic material of the multilayer coil devices, the insulating property of the soft magnetic material is a problem. In particular, when the magnetic material and the coil conductor are directly in contact with each other, a short circuit occurs at the time of applying voltage if the insulating property of the soft magnetic material is low.

Moreover, if a soft magnetic material having a low insulating property is used as a magnetic core of a coil, such as a choke coil for power supply, an eddy current is generated in soft magnetic particles, and a loss due to the eddy current occurs.

Patent Document 1 discloses an invention relating to a multilayer inductor. In this invention, a resin is impregnated in voids between Fe—Si—Cr alloy particles in a magnetic material.

Patent Document 2 discloses an invention relating to a multilayer inductor. In this invention, a resin is impregnated in voids between soft magnetic metal particles, the soft magnetic metal particles include oxide films, and the oxide films are composed of oxides containing Si.

Patent Document 1: JP2012238840 (A)
Patent Document 2: JP2019117898 (A)

BRIEF SUMMARY OF THE INVENTION

At present, there is a demand for multilayer coil devices having further improved strength in addition to various magnetic characteristics.

The object of the present invention is to provide a multilayer coil device with improved strength.

To achieve the above object, a multilayer coil device according to the present invention comprises an element formed by laminating a coil conductor and a magnetic element body, wherein
  the magnetic element body comprises soft magnetic particles and an epoxy resin,
  the soft magnetic particles include soft magnetic metal particles,
  the epoxy resin has an epoxy value of 150 or less, and
  the epoxy resin is filled in gap spaces between the soft magnetic particles.

The epoxy resin may include at least one or more epoxy resins of a formula (1) to a formula (3), where R is H or a methyl group.

The epoxy resin may include the epoxy resin of the formula (1).

The soft magnetic particles may include oxide films covering the soft magnetic metal particles.

The oxide films may have an average thickness of 5 nm or more and 60 nm or less.

The soft magnetic metal particles may have a Fe content of 92.5 mass % or more and 97.0 mass % or less and a Si content of 3.0 mass % or more and 7.5 mass % or less, and the soft magnetic metal particles may not substantially include Cr.

A mass ratio of the epoxy resin to a total mass of the coil conductor and the magnetic element body may be 0.5 mass % or more and 5.0 mass % or less.

A method of manufacturing a multilayer coil device according to the present invention comprises an element formed by laminating a coil conductor and a magnetic element body, the method comprising a step of impregnating the element with an epoxy resin having an epoxy value of 150 or less.

The epoxy resin may include at least one or more epoxy resins of a formula (1) to a formula (3), where R is H or a methyl group.

-continued (3)

DETAILED DESCRIPTION OF THE INVENTION

Hereinafter, the present invention is explained based on an embodiment shown in the figures.

Figure 1:
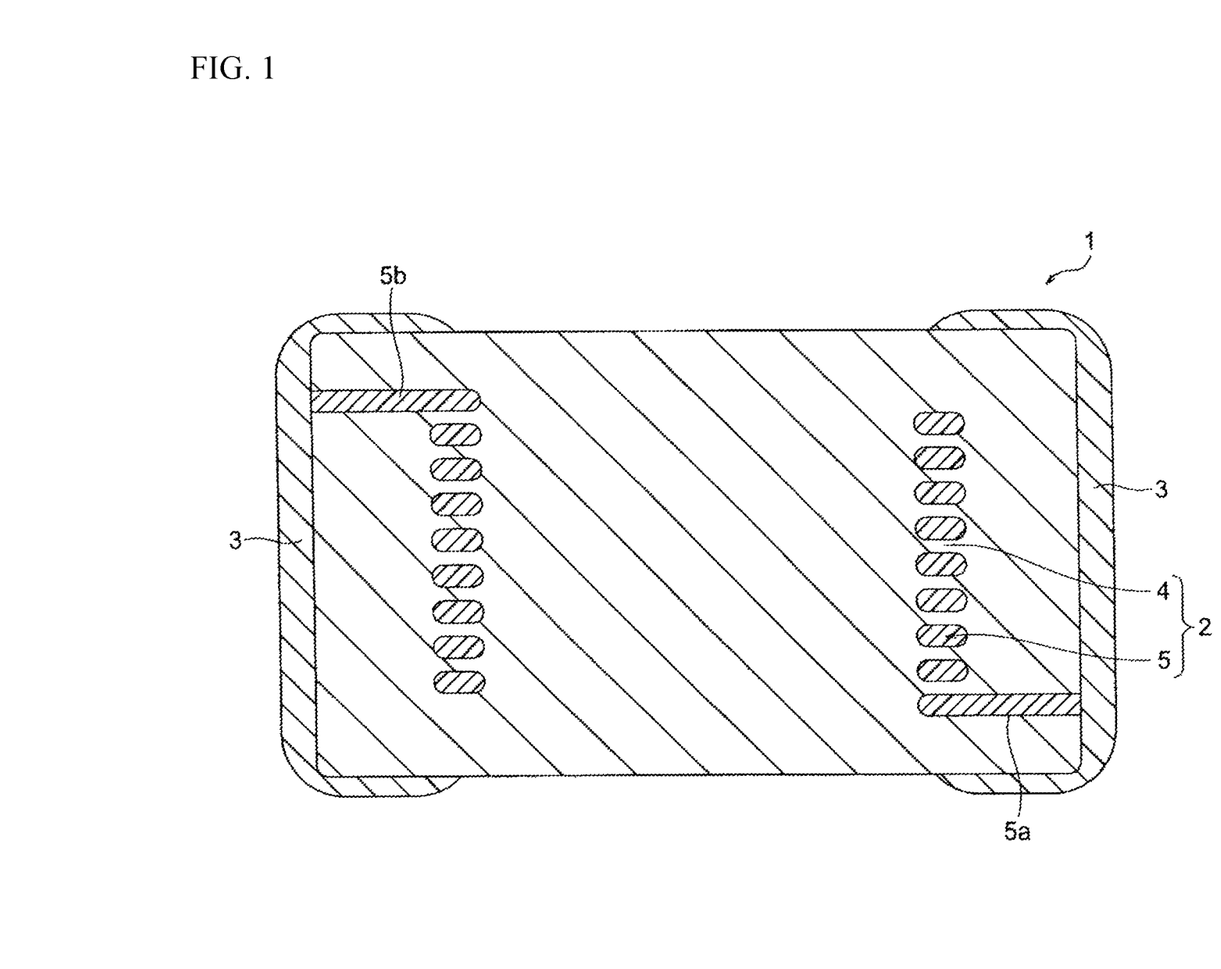
FIG. 1 is a multilayer inductor according to an embodiment of the present invention.

In the present embodiment, a multilayer inductor shown in FIG. 1 is exemplified as a multilayer coil device.

As shown in FIG. 1, a multilayer inductor 1 according to the present embodiment includes an element 2 and terminal electrodes 3. The element 2 has a structure in which a coil conductor 5 is embedded three-dimensionally and spirally inside a magnetic element body 4. The terminal electrodes 3 are formed at both ends of the element 2 and are connected to the coil conductor 5 via leading electrodes 5a and 5b.

The element 2 has any shape, but normally has a rectangular parallelepiped shape. The element 2 has any appropriate size based on usage. For example, the element 2 may have a size of 0.2-3.2 mm×0.1-2.5 mm×0.1-1.3 mm or 0.2-2.5 mm×0.1-2.0 mm×0.1-1.2 mm.

The terminal electrodes 3 can be made of any material that is an electrical conductor, such as Ag, Cu, Au, Al, Ag alloy, and Cu alloy. In particular, Ag is preferably used for its inexpensiveness and low resistance. The terminal electrodes 3 may contain glass frit. The surfaces of the terminal electrodes 3 may be plated. For example, Cu, Ni, and Sn or Ni and Sn may be plated in order on the surfaces of the terminal electrodes 3.

The coil conductor 5 and the leading electrodes 5a and 5b can be made of any material that is an electrical conductor, such as Ag, Cu, Au, Al, Ag alloy, and Cu alloy. In particular, Ag is preferably used for its inexpensiveness and low resistance.

Figure 2:
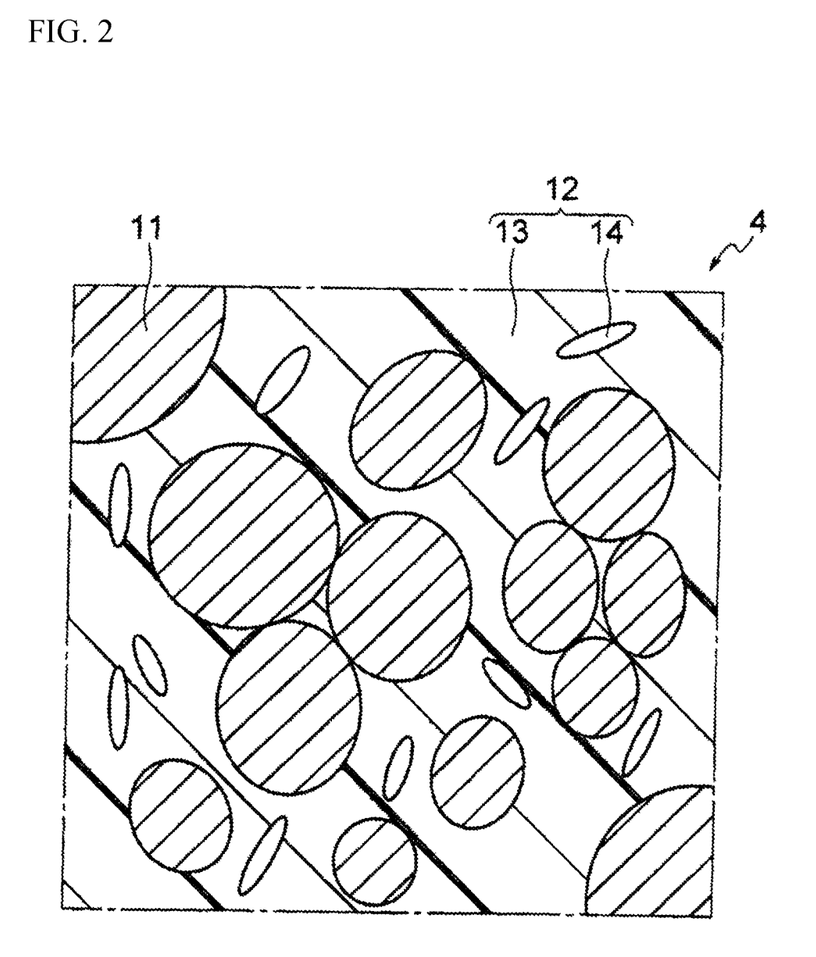
FIG. 2 is a cross-sectional schematic view of a magnetic element body in the multilayer inductor of FIG. 1.

As shown in FIG. 2, the magnetic element body 4 consists of soft magnetic particles 11 and a resin 13. FIG. 2 is a cross-sectional schematic view of the magnetic element body 4. The portions of the magnetic element body 4 other than the soft magnetic particles 11 are defined as gap spaces 12. The gap spaces 12 are filled with the resin 13. The portions where the resin 13 is not filled are voids 14. At the stage before filling with the resin, all of the gap spaces 12 are the voids 14.

Since the resin 13 is filled, the insulating property between the soft magnetic particles 11 becomes higher, and the Q is further improved, as compared with the case where the resin 13 is not filled. In addition, the reliability and heat resistance of the multilayer inductor 1 are improved.

In the multilayer inductor 1 according to the present embodiment, the resin 13 is an epoxy resin, and this epoxy resin has an epoxy value of 150 or less. The epoxy value is a mass (unit: g) of an epoxy-group-containing compound containing 1 equivalent of the epoxy group.

The epoxy resin has a comparatively small volume loss due to curing. Thus, the voids 14 are reduced, and the filling rate of the resin 13 is increased. When the epoxy resin is used, it is possible to increase the amount of the resin 13 contained in the magnetic element body 4. When an epoxy resin having an epoxy value of 150 or less is used, a dense cross-linking network of the epoxy resin is formed, and the cross-linking density is increased. The strength of the magnetic element body 4 is increased by the action of both smallness of volume loss due to curing and high crosslink density.

The type of the epoxy resin having an epoxy value of 150 or less is not limited, but an epoxy resin containing three or more epoxy groups in one molecule is preferably employed. This is because the crosslink density tends to be high.

As the epoxy resin having an epoxy value of 150 or less, it is preferable to include at least one or more epoxy resins of the following formula (1) to formula (3), and it is more preferable to include the epoxy resin of the formula (1). R is H or a methyl group.

There is no particular limit on the ratio of any epoxy resin of the formula (1) to the formula (3) to the entire resin, but the ratio of any epoxy resin of the formula (1) to the formula (3) to the entire resin is preferably 50 mass % or more in total. More preferably, the ratio of the epoxy resin of the formula (1) to the entire resin is 30 mass % or more.

When the epoxy resin having an epoxy value of 150 or less and an epoxy resin having an epoxy value of more than 150 are mixed, the epoxy value of the mixed epoxy resin can be calculated from the epoxy value of each epoxy resin and the mixing ratio. Then, the mixed epoxy resin has an epoxy value of 150 or less.

The resin 13 may be obtained by mixing the epoxy resin having an epoxy value of 150 or less and a cyanate compound. There is no particular limit on the type of the cyanate compound, but the cyanate compound of the following formula (4) is preferable. Each R independently represents H or a methyl group.

(4)

There is no particular limit on the ratio of the cyanate compound. For example, the ratio of the cyanate compound to the total of the epoxy resin and the cyanate compound may be 75 mass % or less. The heat resistance of the multilayer inductor 1 is further improved as the ratio of the cyanate compound is higher, but the strength of the magnetic element body 4 tends to decrease if the ratio of the cyanate compound is too high.

The soft magnetic particles 11 may consist of soft magnetic metal particles and oxide films covering the soft magnetic metal particles.

The material of the soft magnetic metal particles is not limited and is, for example, a Fe—Si based alloy mainly including Fe and Si or a permalloy mainly including Fe, Ni, Si, and Co. The Fe—Si based alloy is preferable.

When the material of the soft magnetic metal particles is the Fe—Si based alloy, assuming that the total of the Fe content and the Si content is 100 mass %, the Si content is preferably 7.5 mass % or less in terms of Si. That is, the Fe content is preferably 92.5 mass % or more in terms of Fe.

When the Si content is too large, the moldability at the time of molding deteriorates, and the density of the fired body after firing consequently tends to decrease. In addition, the oxidized state of the fired alloy particles after the heat treatment cannot be appropriately maintained, and the magnetic permeability particularly tends to decrease.

When the total of the Fe content and the Si content is 100 mass %, the Si content is preferably 3.0 mass % or more in terms of Si. That is, the Fe content is preferably 97.0 mass % or less in terms of Fe.

When the Si content is too small, the moldability is improved, but the oxidized state of the soft magnetic metal particles after sintering cannot be appropriately maintained, and the specific resistance tends to decrease.

In the Fe—Si based alloy according to the present embodiment, assuming that the total of the Fe content and the Si content is 100 mass %, the amount of other elements excluding O is 0.15 mass % or less at the maximum. In addition, Cr is not substantially contained. The fact that Cr is not substantially contained means that the Cr content is 0.03 mass % or less. That is, in the present embodiment, the Fe—Si based alloy does not contain the Fe—Si—Cr alloy.

The soft magnetic metal particles according to the present embodiment may contain P. When the material of the soft magnetic metal particles is the Fe—Si based alloy, P is preferably contained in an amount of 110-650 ppm with respect to the total of 100 mass % of the Fe content and the Si content. When the soft magnetic metal particles contain P, it is easy to obtain a multilayer inductor having improved specific resistance and magnetic properties. When P is contained in the above-mentioned range, it is easy to exhibit a high resistivity to the extent that no short circuit is generated in the magnetic element body 4.

The reason why the multilayer inductor 1 according to the present embodiment has the above-mentioned characteristics is speculated, for example, as below. That is, it is conceivable that when the Fe—Si alloy is subjected to a heat treatment in a state where a predetermined amount of phosphorus is contained, the oxidation state of the soft magnetic metal particles constituting the magnetic element body 4 after the heat treatment, namely, the coverage rate, thickness, and the like of the oxide film are controlled appropriately. As a result, the magnetic element body 4 after the heat treatment exhibits a high specific resistance and can also exhibit predetermined magnetic properties. Thus, the magnetic element body 4 according to the present embodiment is favorable as a magnetic element body that directly comes into contact with the coil conductor 5.

When the material of the soft magnetic metal particles is a permalloy, preferably, the Fe content is 45-60 mass %, the Ni content is 33-48 mass %, the Si content is 1-6 mass %, and the Co content is 1-6 mass % with respect to 100 mass % of the total of the Fe content, the Ni content, the Si content, and the Co content. The permalloy does not substantially contain Cr. That is, when the total amount of Fe, Ni, Si, and Co is 100 mass %, the Cr content is 0.06 mass % (600 ppm) or less. In addition, the amount of other elements excluding O, such as P, is 0.15 mass % (1500 ppm) or less at the maximum.

Preferably, the oxide films covering the soft magnetic metal particles according to the present embodiment include a layer made of an oxide containing Si. Preferably, the soft magnetic metal particles and the layer made of an oxide containing Si are in contact with each other. When the oxide films covering the soft magnetic metal particles include a layer made of an oxide containing Si, the insulating property between the soft magnetic particles 11 is improved, and the Q value is thereby improved. When the oxide films covering the soft magnetic metal particles include a layer made of a compound containing Si, it is also possible to prevent the formation of Fe oxides.

There is no particular limitation on a method of confirming whether or not the oxide films covering the soft magnetic metal particles include a layer made of an oxide containing Si and whether or not the resin 13 is filled in the gap spaces 12. For example, SEM-EDS measurement and STEM-EDS measurement can visually confirm whether or not the oxide films covering the soft magnetic metal particles include a layer made of an oxide containing Si and whether or not the resin 13 is filled in the gap spaces 12. In addition, the impregnation rate mentioned below can be confirmed.

The oxide films have any thickness. The oxide films can have any structure except that the Si oxide layer is in contact with the soft magnetic metal particles. For example, the oxide films may consist of only the Si oxide layer or may have a multilayer structure of the Si oxide layer and another oxide layer. The Si oxide layer in contact with the soft magnetic metal particles may substantially consist of a Si oxide. The thickness of the oxide films and the thickness of each layer can be measured using STEM-EDS measurement images. In the present embodiment, preferably, the oxide films have an average thickness of 5 nm or more and 60 nm or less. This average thickness is an average thickness when the thicknesses of the oxide films for at least 50 or more soft magnetic particles 11 are measured.

The oxide films are formed by any method. For example, the oxide films can be formed by firing a soft magnetic metal powder. The thickness of the oxide films and the thickness of each oxide layer can be controlled by firing conditions, such as firing temperature and time, annealing conditions, and the like. As the oxide films become thicker, the gap spaces 12 become smaller, and the filling amount of the resin 13 decreases. Preferably, the Si oxide is substantially contained only in the oxide films and is not substantially present in the gap spaces 12 on the outer side of the oxide films.

The soft magnetic particles 11 may be cermet particles. Specifically, the soft magnetic particles 11 may have a structure in which a plurality of ceramic particles having a particle size smaller than that of the soft magnetic metal particles is attached around one soft magnetic metal particle. The material of the soft magnetic metal particles is not limited and may be, for example, the above-mentioned Fe—Si based alloy or the above-mentioned permalloy. The material of the ceramic particles is not limited and may be, for example, $Zn_2SiO_4$.

The average particle size (D50) of the soft magnetic particles 11 is not limited and may be, for example, 2 μm to 20 μm.

Next, an example of a method of manufacturing the above-mentioned multilayer inductor is explained. First, a method of producing a soft magnetic powder to be a raw material of soft magnetic particles constituting a magnetic element body is explained. In the present embodiment, the soft magnetic powder can be obtained using a method similar to a known method of producing the soft magnetic powder and can specifically be produced using a gas atomization method, a water atomization method, a rotating disc method, or the like. Among them, a water atomization method is preferably employed for easy acquisition of a soft magnetic powder having desired magnetic properties. Moreover, the average particle size of the soft magnetic particles to be finally obtained can be controlled by controlling the particle size of the soft magnetic powder.

In a water atomization method, a fine powder is obtained by supplying a molten raw material (molten metal) as a linear continuous fluid via a nozzle provided at a bottom of a crucible and spraying a high-pressure water against the supplied molten metal to atomize and rapidly cool the molten metal.

The soft magnetic powder according to the present embodiment can be manufactured by melting the raw material of Fe and the raw material of Si and turning the molten material containing P to a fine powder by the water atomization method. In the raw materials, for example, when P is contained in the raw material of Fe, the amount of P contained in the soft magnetic particles to be finally obtained can be controlled by controlling the total amount of the P content in the raw material of Fe and the addition amount of P. The molten material may be turned into a fine powder by a water atomization method. Instead, the molten material in which the P content in the soft magnetic powder is adjusted within the above-mentioned range using a plurality of raw materials of Fe having different amounts of P may be turned into a fine powder by a water atomization method.

Next, a multilayer inductor is manufacturing using the soft magnetic powder obtained in such a manner. The multilayer inductor can be manufactured by any known method. Hereinafter, a method of manufacturing a multilayer inductor using a sheet method is explained.

The obtained soft magnetic powder is slurried with a solvent and additives, such as a binder, to prepare a paste. Then, this paste is used to form green sheets to be a magnetic element body after firing. Next, a coil conductor paste is applied onto the green sheets to form coil conductor patterns. The coil conductor paste is prepared by slurrying a metal (e.g., Ag) to be the coil conductor together with a solvent and additives, such as a binder. Then, the green sheets on which the coil conductor patterns are formed are laminated, and the coil conductor patterns are thereafter joined to obtain a green laminated body in which the coil conductor is three-dimensionally and spirally formed.

The obtained laminated body is subjected to a heat treatment (a binder removal step and a firing step) to remove the binder, and the soft magnetic particles contained in the soft magnetic powder become fired particles. Then, a laminated body as a fired body in which the fired particles are connected to each other and fixed (integrated) is obtained. As long as the binder can be decomposed and removed as a gas, the holding temperature (binder removal temperature) in the binder removal step is not limited, but is preferably 300-450° C. in the present embodiment. The holding time (binder removal time) in the binder removal step is not limited either, but is preferably 0.5-2.0 hours in the present embodiment.

The holding temperature (firing temperature) in the firing step is not limited, but is preferably 550-850° C. in the present embodiment. The holding time (firing time) in the firing step is not limited either, but is preferably 0.5-3.0 hours in the present embodiment.

In the present embodiment, it is preferable to adjust the atmospheres in the binder removal and firing. Specifically, the binder removal and firing may be performed in an oxidizing atmosphere, such as the air, but are preferably performed in an atmosphere having a weaker oxidizing power than the air atmosphere, such as a nitrogen atmosphere and a mixed atmosphere of nitrogen and hydrogen. This makes it possible to improve the density of the magnetic element body and further improve the magnetic permeability and the like while maintaining a high specific resistance of the soft magnetic particles. In addition, it becomes easy to form Si oxide films on the surfaces of the soft magnetic particles, and it becomes difficult to form an oxide of Fe. As a result, it is possible to prevent a decrease in inductance due to oxidation of Fe.

An annealing treatment may be performed after firing. The annealing treatment is performed under any conditions, such as at 500-800° C. for 0.5-2.0 hours. The atmosphere after annealing is not limited, either.

The composition of the soft magnetic particles after the heat treatment is substantially the same as the composition of the soft magnetic powder before the heat treatment.

Next, terminal electrodes are formed on the element. The terminal electrodes are formed by any method, but are normally formed by slurrying a metal (e.g., Ag) to be the terminal electrodes together with a solvent and additives, such as a binder.

Next, the gap spaces are filled with a resin by impregnating the element with an epoxy resin having an epoxy value of 150 or less. The epoxy resin is impregnated by any method, such as vacuum impregnation.

Vacuum impregnation is performed by immersing the above-mentioned multilayer inductor into the resin and controlling the atmospheric pressure. The resin penetrates into the magnetic element body by lowering the atmospheric pressure. Since the gap spaces are present from the surface to the inside of the magnetic element body, the resin penetrates into the magnetic element body via the gap spaces according to the principle of the capillary phenomenon, and the gap spaces are thereby filled with the resin.

The above-mentioned resin may be a mixture of an epoxy resin and a curing agent. The curing agent can be a wellknown curing agent used for epoxy resins. The above-mentioned resin may be a mixture of an epoxy resin and the above-mentioned cyanate compound. If necessary, additives excluding epoxy resins, cyanate compounds, and curing agents may be added.

Preferably, the degree of vacuum based on the atmospheric pressure is −95 kPa to −90 kPa. When the degree of vacuum is worse than −90 kPa, voids tend to remain inside the magnetic element body after vacuum impregnation. Even if the degree of vacuum is better than −95 kPa, the multilayer inductor does not have failure, but the manufacturing cost of the multilayer inductor tends to increase.

The time for immersing the multilayer inductor is not limited and may be, for example, 1-10 minutes. If the immersion time is too short, the impregnation rate decreases. If the immersion time is too long, the manufacturing cost of the multilayer inductor tends to increase.

Next, the multilayer inductor is washed with any solvent, such as toluene, acetone, a solvent in which toluene and isobutyl alcohol (IBA) are mixed, and a solvent in which acetone and IBA are mixed.

After the multilayer inductor is washed with the solvent, the semi-cured epoxy resin is completely cured. For example, the epoxy resin is cured by heating at 180-190° C. for 5-10 hours.

Preferably, the resin content in the magnetic element body of the multilayer inductor finally obtained is 1.5 mass % or more and 5.0 mass % or less. The strength tends to be lower as the amount of the resin becomes smaller. When the amount of the resin becomes smaller, the inductance becomes larger, but the Q value tends to be smaller.

In the present embodiment, the terminal electrodes can be electroplated after filling the resin. Since the resin is filled in the gap spaces, a plating solution does not easily penetrate into the magnetic element body even if the multilayer inductor is put into a plating solution. Thus, even after plating, no short circuit is generated inside the multilayer inductor, and a high inductance is maintained.

Hereinbefore, an embodiment of the present invention is explained, but the present invention is not limited to the above-mentioned embodiment and may variously be modified within the scope of the present invention.

EXAMPLES

Hereinafter, the invention is explained in more detail using Examples, but the present invention is not limited to them.

Experimental Example 1

As raw materials, first, a simple substance of Fe and a simple substance of Si were prepared. The simple substances were mixed and housed in a crucible placed in a water atomizer. The crucible was heated to 1600° C. or more by high-frequency induction using a work coil provided outside the crucible in an inert atmosphere, and an ingot, a chunk, or a shot in the crucible was melted and mixed to obtain a molten metal. The phosphorus content was adjusted by adjusting the amount of phosphorus contained in the raw material of the simple substance of Fe at the time of melting and mixing the raw materials of the soft magnetic metal powder.

Next, the molten metal supplied so as to form a linear continuous fluid from a nozzle provided in the crucible was hit with a high-pressure (50 MPa) water stream so as to be droplets and rapidly cooled, dehydrated, dried, and classified at the same time. Then, a soft magnetic metal powder composed of Fe—Si based alloy particles was produced. The production conditions, classification conditions, and the like were appropriately controlled so that the particle size of the soft magnetic metal powder would be about 3 μm.

As a result of composition analysis of the obtained soft magnetic metal powder by the ICP analysis method, it was confirmed that the soft magnetic metal powders used in all of Examples and Comparative Examples were Fe: 94 mass % and Si: 6 mass % and the P content: 350 ppm. It was also confirmed that elements other than Fe, Si, and P, such as Cr, were not substantially contained.

The above-mentioned soft magnetic metal powder was slurried with a solvent and additives, such as a binder, to prepare a paste. Then, using this paste, green sheets to be a magnetic element body after firing was formed. A green laminated body was produced by forming Ag conductors (coil conductors) with predetermined patterns on the green sheets and laminating them.

The obtained green laminated body was cut to obtain a green multilayer inductor. The obtained multilayer inductor was subjected to a binder removal treatment at 400° C. under an inert atmosphere and was thereafter fired with the conditions of 750° C.-1 h in a reducing atmosphere to obtain a fired body. The size of the obtained fired body was length: 1.0 mm, width: 0.5 mm, and height: 0.5 mm. The inert atmosphere was $N_2$ gas, and the reducing atmosphere was an atmosphere of a mixed gas of $N_2$ and $H_2$ gas with a hydrogen concentration of 1.0%. A paste for terminal electrodes was applied onto both end surfaces of the obtained fired body, dried, and baked at 650° C. for 0.5 hours to form terminal electrodes. Then, a multilayer inductor (baked product) was obtained.

Next, the obtained baked products of all samples were subjected to vacuum impregnation with a mixture of resin raw materials, washed, and thereafter heated to cure the resin. Then, gap spaces of the multilayer inductor were filled with the resin.

In Sample Nos. 1-6 (Example), first, a mixture of resin raw materials was prepared. 300 g of JER630 (manufactured by Mitsubishi Chemical Corporation), which was an epoxy resin represented by the formula (1), and 30 g of 2E4MZ (manufactured by Shikoku Chemicals Corporation), which was a curing agent, were mixed to obtain a mixture of resin raw materials.

The multilayer inductor (baked product) was immersed into the mixture of resin raw materials.

Next, the multilayer inductor (baked product) immersed in the mixture of resin raw materials was placed in a vacuum heating dryer, evacuated to a degree of vacuum of −90 kPa, and impregnated for 5-10 minutes in the vacuumed state.

Next, toluene or acetone was prepared, and the multilayer inductor was washed with a cleaning solvent in which (toluene or acetone):IBA was 8:2 in a weight ratio.

Then, the resin was cured by heating at 180° C. for 10 hours.

When the number of impregnations was two or more, the steps from the step of vacuum impregnation of the mixture of resin raw materials to the step of curing the resin were repeated.

Then, electrolytic plating was performed to form a Ni plating layer and a Sn plating layer on the terminal electrodes.

Hereinafter, the vacuum impregnations in the experimental example other than Sample Nos. 1-6 are described, but the parts not described are the same as those of the Sample Nos. 1-4.

Sample No. 7 (Example) was carried out under the same conditions as in Sample Nos. 1-4 except that the epoxy resin was changed from JER630 to a 50 wt %-50 wt % mixture of hydroquinone diglycidyl ether and methyl hydroquinone diglycidyl ether. The resin content was set to the value shown in Table 1. The 50 wt %-50 wt % mixture of hydroquinone diglycidyl ether and methyl hydroquinone diglycidyl ether was an epoxy resin represented by the formula (2). Sample No. 8 (Example) was carried out under the same conditions as Sample Nos. 1-4 except that the epoxy resin was changed from JER630 to EPICLON HP-4032. The resin content was set to the value shown in Table 1. EPICLON HP-4032 was an epoxy resin represented by the formula (3).

Sample No. 9 (Comparative Example) was carried out under the same conditions as Sample Nos. 1-4 except that the epoxy resin was changed from JER630 to epoxy resin B (EPICLON N655-EXP-S). The resin content was set to the value shown in Table 1. The epoxy value of EPICLON N655-EXP-S exceeds 150. Sample No. 10 (Comparative Example) was carried out under the same conditions as Sample Nos. 1-4 except that the epoxy resin was changed from JER630 to epoxy resin C (JER152). The resin content was set to the value shown in Table 1. The epoxy value of JER152 exceeds 150.

In Sample No. 12 (Comparative Example), the mixture of resin raw materials was a bisphenol A type epoxy resin mixture (JER825) having an epoxy value of 170-180. In Sample No. 13 (Comparative Example), the mixture of resin raw materials was a bisphenol F type epoxy resin mixture (JER806) having an epoxy value of 160-170. Vacuum impregnation was performed for 6 minutes. The degree of vacuum at the time of vacuum impregnation was set to −95 kPa. In Sample Nos. 12 and 13, as the cleaning solvent, toluene was used, and IBA was not used. The resin was cured by heating at 180° C. for 10 hours.

For the impregnated product in which the resin was cured after vacuum impregnation and the plated product after plating in each sample, a mass ratio of the resin to a total mass of the coil conductor and the magnetic element body was measured using TG-DTA. The results are shown in Table 1. In all of the samples, there was substantially no change in the mass ratio of the resin between the impregnated product and the plated product. Moreover, the composition of the magnetic element body was confirmed by an ICP analysis method, and it was confirmed that the composition of the magnetic element body was substantially the same as the composition of the soft magnetic metal powder as the raw material.

Moreover, an observation was performed using STEM-EDS at a magnification of 20000 times with a size of 7 μm×7 μm, and it was confirmed that Si was not substantially present other than in the oxide films. It was also confirmed that the soft magnetic metal particles and the Si oxide layer in contact with the soft magnetic metal particles were present in all of the samples. It was also confirmed that the average thickness of the oxide films was 5 nm or more and 60 nm or less in all of the samples.

The bending strength was measured for the multilayer inductor of each sample. The bending strength was measured at 10 mm/min using a CPU GAUGE 9500SERIES manufactured by Aiko Engineering Co., Ltd. The results are shown in Table 1. The results shown in Table 1 are average values obtained by measuring the bending strengths of 10 multilayer inductors. In the present example, a bending strength of 12.0 N or more was considered to be good.

TABLE 1

| No. | Ex./Comp. Ex. | Resin | Resin Content (mass %) | Number of Impregnations | Cleaning Solvent | Bending Strength (N) |
|---|---|---|---|---|---|---|
| 1 | Ex. | JER630 | 1.6 | 1 | acetone + IBA | 12.2 |
| 2 | Ex. | JER630 | 1.7 | 1 | toluene + IBA | 14.1 |
| 3 | Ex. | JER630 | 1.8 | 1 | acetone + IBA | 16.6 |
| 4 | Ex. | JER630 | 2.5 | 1 | toluene + IBA | 21.1 |
| 5 | Ex. | JER630 | 3.2 | 2 | acetone + IBA | 26.0 |
| 6 | Ex. | JER630 | 4.1 | 2 | toluene + IBA | 35.0 |
| 7 | Ex. | hydroquinone type epoxy resin | 2.4 | 1 | toluene + IBA | 20.0 |
| 8 | Ex. | EPICLON HP- 4032 | 2.3 | 1 | toluene + IBA | 19.0 |
| 9 | Comp. Ex. | epoxy resin B(N- 655- EXP- S) | 1.7 | 1 | toluene + IBA | 11.0 |
| 10 | Comp. Ex. | epoxy resin C(JER152) | 1.8 | 1 | toluene + IBA | 11.0 |
| 12 | Comp. Ex. | bisphenol A type epoxy resin (JER825) | 3.0 | 2 | toluene | 8.0 |
| 13 | Comp. Ex. | bisphenol F type epoxy resin (JER806) | 3.0 | 2 | toluene | 8.0 |

Table 1 shows that the bending strength was good in Sample Nos. 1-8, where the resin was an epoxy resin having an epoxy value of 150 or less. When JER630, which is the epoxy resin of the formula (1), was used, the bending strength was higher than that when other epoxy resins were used. The higher the resin content was, the higher the bending strength was. On the other hand, the bending strength was too low in Sample Nos. 9-10 and 12-13, where the resin was an epoxy resin having an epoxy value of more than 150.

Experimental Example 2

Experimental Example 2 was carried out similarly to Sample No. 4 of Experimental Example 1 except that JER630 and another epoxy resin used in Experimental Example 1 were mixed. The results are shown in Table 2. In all experimental examples shown in Table 2, the epoxy value of the epoxy resin was 150 or less.

TABLE 2

| No. | Mass Ratio of Epoxy Resin | | | | Resin Content (mass %) | Bending Strength (N) |
| --- | --- | --- | --- | --- | --- | --- |
| | JER630 | Hydroquinone Type Epoxy Resin | EPICLON HP-4032 | JER806 | | |
| 4 | 100 | 0 | 0 | 0 | 2.5 | 21.1 |
| 21 | 50 | 50 | 0 | 0 | 2.2 | 19.0 |
| 22 | 50 | 0 | 50 | 0 | 2.3 | 20.0 |
| 23 | 33.3 | 33.3 | 33.3 | 0 | 2.1 | 18.0 |
| 24 | 60 | 0 | 0 | 40 | 2.0 | 16.0 |

Table 2 shows that the bending strength was high even when JER630 and another resin were mixed.

Experimental Example 3

In Experimental Example 3, changes in heat resistance and bending strength due to mixing a cyanate compound represented by the formula (4) with an epoxy resin (JER630) were confirmed.

Specifically, all samples were carried out similarly to Sample No. 2 of Experimental Example 1 except that JER630 and the cyanate compound were mixed at the mass ratio shown in Table 3.

In the heating test, first, 10 obtained multilayer inductors were sampled, and the mass was measured. Next, the multilayer inductors were heated at 300° C. for 0.5 hours. Then, the mass of each multilayer inductor after heating was measured to calculate a mass reduction rate of each multilayer inductor. The results shown in Table 3 are average values obtained by calculating the mass reduction rates for the 10 multilayer inductors.

TABLE 3

| No. | Ex./ Comp. Ex. | Mass Ratio | | Resin Content (mass %) | Heating Test Mass Reduction Rate (%) | Bending Strength (N) |
| --- | --- | --- | --- | --- | --- | --- |
| | | JER630 | Cyanate | | | |
| 2 | Ex. | 100 | 0 | 1.7 | 0.59 | 14.1 |
| 31 | Ex. | 75 | 25 | 1.7 | 0.47 | 14.3 |
| 32 | Ex. | 50 | 50 | 1.7 | 0.30 | 14.6 |
| 33 | Ex. | 25 | 75 | 1.7 | 0.14 | 14.2 |
| 34 | Comp. Ex. | 0 | 100 | 1.7 | 0.10 | 11.5 |

Table 3 shows that the heat resistance was better as the proportion of the cyanate compound was higher. When JER630 was not contained and only the cyanate compound was contained, however, the bending strength was low.

DESCRIPTION OF THE REFERENCE NUMERICAL

1 . . . multilayer inductor
2 . . . element
3 . . . terminal electrode
4 . . . magnetic element body
5 . . . coil conductor
5a, 5b . . . leading electrode
11 . . . soft magnetic particle
12 . . . gap space
13 . . . resin
14 . . . void

What is claimed is:

1. A multilayer coil device comprising an element formed by laminating a coil conductor and a magnetic element body, wherein the magnetic element body comprises soft magnetic particles and an epoxy resin, the soft magnetic particles include soft magnetic metal particles, the epoxy resin has an epoxy value of 150 or less, the epoxy resin is filled in gap spaces between the soft magnetic particles, a mass ratio of the epoxy resin to a total mass of the coil conductor and the magnetic element body is 1.6 mass % or more and 4.1 mass % or less, and the epoxy resin comprises an epoxy resin of a formula (1):

2. The multilayer coil device according to claim 1, wherein the soft magnetic particles comprise oxide films covering the soft magnetic metal particles.

3. The multilayer coil device according to claim 2, wherein the oxide films have an average thickness of 5 nm or more and 60 nm or less.

4. The multilayer coil device according to claim 1, wherein the soft magnetic metal particles have a Fe content of 92.5 mass % or more and 97.0 mass % or less and a Si content of 3.0 mass % or more and 7.5 mass % or less, and the soft magnetic metal particles do not substantially include Cr.

5. A method of manufacturing a multilayer coil device comprising an element formed by laminating a coil conductor and a magnetic element body, the method comprising a step of impregnating the element with an epoxy resin having an epoxy value of 150 or less, wherein a mass ratio of the epoxy resin to a total mass of the coil conductor and the magnetic element body is 1.6 mass % or more and 4.1 mass % or less, and the epoxy resin comprises an epoxy resins of a formula (1):

(1)

* * * * *